United States Patent [19]

Lycke et al.

[11] Patent Number: 4,620,754

[45] Date of Patent: Nov. 4, 1986

[54] MAGAZINE FOR MATERIAL AND/OR TOOLS FOR ROBOT OR LIKE APPLICATIONS

[75] Inventors: Anders H. Lycke, Bromma; Curt R. Soderquist, Kungsängen, both of Sweden

[73] Assignee: International Business Machines Corporation, Armonk, N.Y.

[21] Appl. No.: 611,556

[22] Filed: May 17, 1984

[30] Foreign Application Priority Data

May 20, 1983 [SE] Sweden .................................. 8302859

[51] Int. Cl.[4] .............................................. A47B 88/08
[52] U.S. Cl. .................................. 312/330 R; 312/201
[58] Field of Search ...................... 312/330 R, 201, 184

[56] References Cited

U.S. PATENT DOCUMENTS 3,264,049  8/1966  Peterson ........................ 312/330 X

FOREIGN PATENT DOCUMENTS 1189690  3/1965  Fed. Rep. of Germany ...... 312/184
 197805 10/1976  Netherlands ........................ 312/201

*Primary Examiner*—Francis K. Zugel
*Assistant Examiner*—Joseph Falk

[57] ABSTRACT

A magazine for supplying material and/or tools to robots or like apparatus which includes two units in the form of chests of drawers. The drawers are movable into the free space between the units by a mechanism which includes hydraulic or like means for moving a follower member which carries hydraulic or like cylinders for selective actuation of follower pins. The follower pins are arranged for selective interaction with holes in the extended side walls of the drawers.

6 Claims, 4 Drawing Figures

MAGAZINE FOR MATERIAL AND/OR TOOLS FOR ROBOT OR LIKE APPLICATIONS

BACKGROUND OF THE INVENTION

1. Field of the Invention

The invention relates to a magazine for supplying materials and/or tools, for example, to an assembly robot or like system.

2. Description of the Prior Art

Modern assembly robots or like systems can work without human interaction for a long time. Pallets with tools and/or materials are under computer control and are fed into the work envelope of the robot by means of transport systems. Such a transport system is described in U.S. patent application Ser. No. 590,825 filed Mar. 19, 1984. Due to the limited space which is available within the work envelope of the robot and the high working speed of the robot, the pallets carrying material and the pallets carrying assembled units must be changed very often. This affects the productive time ratio of the robot system.

According to prior known techniques, this problem has been solved by supplying material on a conveyor belt which is continuously running through the work envelope of the robot. Such a system requires, for example, exact positioning of the material on the conveyor belt and exact conveyor speed to make it possible for the robot gripper to grasp the parts required.

SUMMARY OF THE INVENTION

The subject invention is intended to remedy the above mentioned drawbacks. It solves the problem by providing the pallets with special magazines, which can hold a large number of different parts and/or tools within a limited volume of the work envelope of the robot. The magazine is in the form of two chests of drawers mounted to the pallet in a spaced relationship. The drawers can selectively be moved under computer control to the open space between them and thereby make its content available for the robot gripper. Thus, a very compact material handling system is obtained.

BRIEF DESCRIPTION OF THE DRAWINGS

One embodiment of the invention, which is defined in the attached claims, is described in more detail below with reference to the attached drawings, of which:

DESCRIPTION OF THE PREFERRED EMBODIMENT

Figure 1:
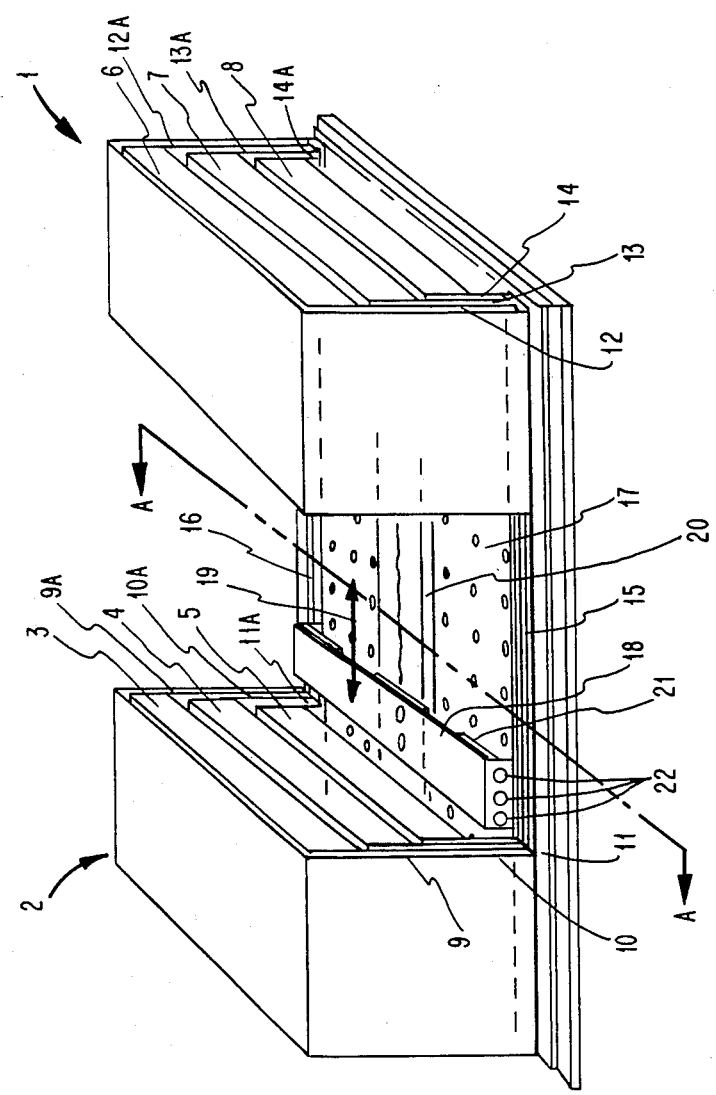
FIG. 1 is a perspective view of a magazine in accordance with the invention.

FIG. 1 shows in perspective view a material and/or tool supply magazine in accordance with the invention. The magazine consists of two units in the form of two chests of drawers 1 and 2. Each chest has three drawers, 3-5 in chest 2 and 6-8 in chest 1, which are movably mounted on a pallet 17 and spaced apart a distance equal to the depth of the chest of drawers. As described more in detail below, the drawers 3-8 are supported by extended side walls 9-14 and 9A-14A which extend down into grooves in two side members 15 and 16 which are fixedly mounted to the pallet 17. A follower member 18 is movable in two directions as indicated by the arrow 19 by means of a hydraulic or like means 20. The follower member 18 is provided at each end with a pneumatic or like cylinder 21 having follower pins 22. The follower pins are arranged to individually interact with openings in the lower parts of the extended side walls of the drawers. Thus, drawers can be selectively moved into the open space between the two units 1 and 2, whereby the content of the selected drawer is made available to the robot gripper.

Figure 2:
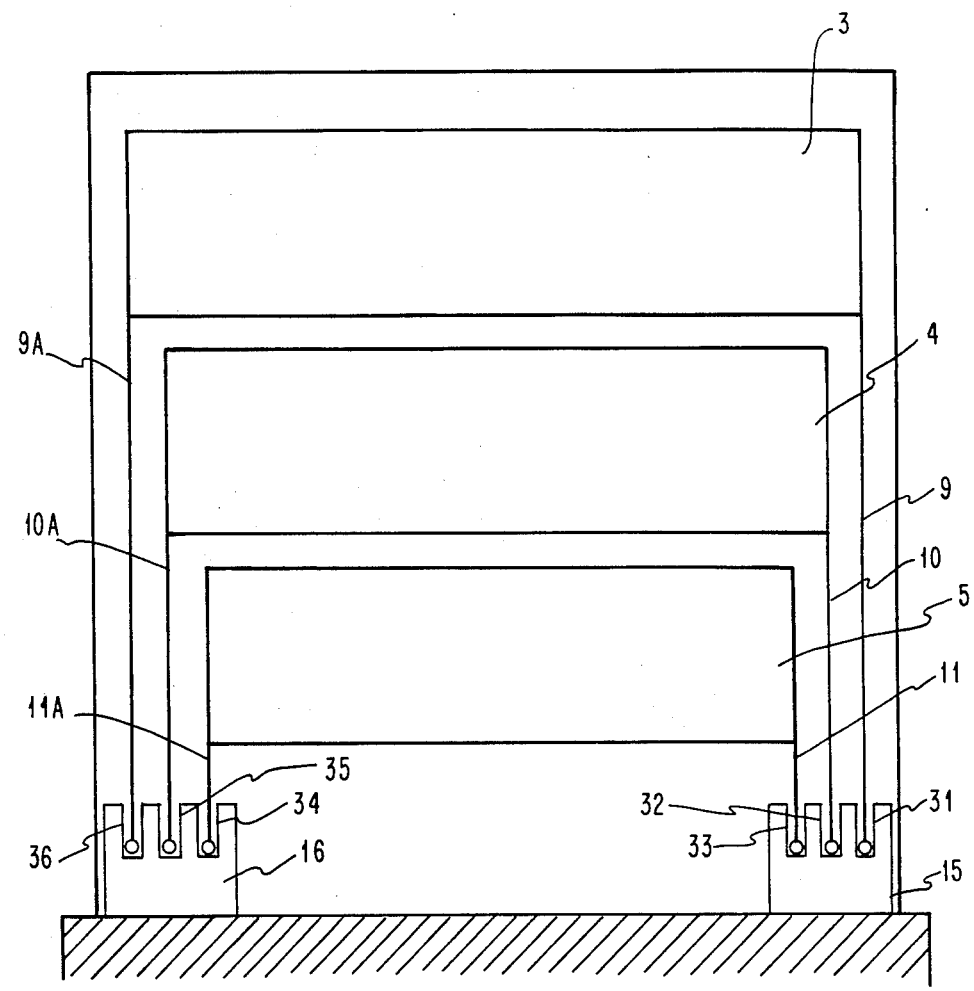
FIG. 2 shows how the drawers are supported.
Figure 3:
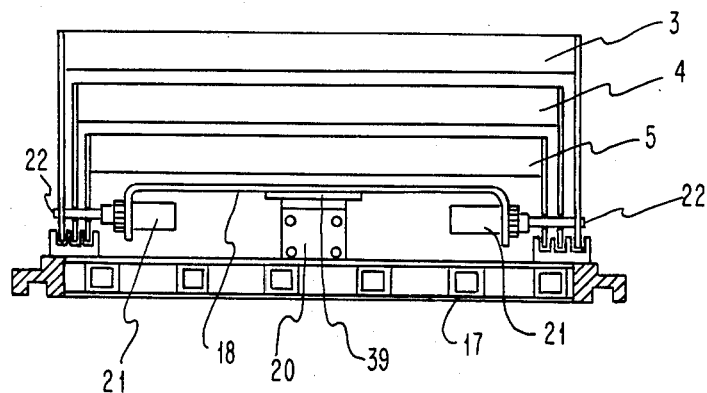
FIG. 3 is a cross-sectional view alone A—A in FIG. 1.

FIG. 2 shows in more detail the support of the drawers 3, 4, 5 by means of extended side walls 9 to 11 and 9A to 11A. The extended side walls extend down into grooves 31–33 and 34–36 in side members 15 and 16, respectively. The side members are fixedly mounted to the pallet. The drawers are movable along said grooves. FIG. 3 shows a cross sectional view taken along the line A—A in FIG. 1. A hydraulic means 20 is fixedly mounted to the pallet 17. The follower member 18 is fixedly mounted to the movable part 39 of said hydraulic device. The follower member 18 is movable by means of the hydraulic or like means 20, for example, the standard linear air cylinder type ORIGA-200 manufactured by Origa Cylinder A.B. Sweden. The movement of the cylinder is controlled by the computer via a 5 port bistable electropneumatic valve, for example, Mecman Ser. No. 463 manufactured by Mecman Suenska Manknads A.B. Sweden. The follower member is provided at each end with a pneumatic cylinder 21, for example, a standard air cylinder type SESPO ESN 1625 P manufactured by Festo Corp., Port Washington, N.Y. The cylinders 21 are each provided with follower means 22 and are controlled from the computer via 3 port monostable electro-pneumatic valves (not shown), for example, Mecman Ser. No. 4432. The movable part 39 is a bar approximately 100 mm. long which attaches the follower member 18 to the actuating piston of the hydraulic cylinder 20.

Figure 4:
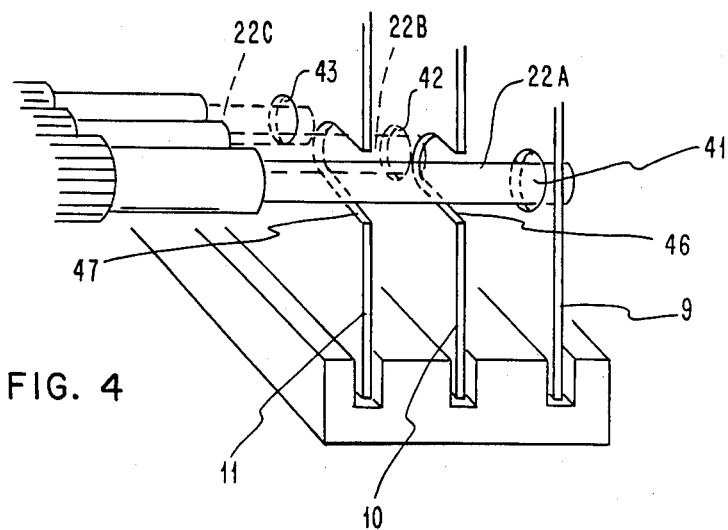
FIG. 4 shows the selection mechanism.

FIG. 4 shows an example of one end of a selection mechanism. The other end is an equivalent mechanism. A follower pin 22A to 22C, at each end of the follower means 18, is provided for interaction with a respective hole 41, 42, 43 in a respective associated side wall extension. Thus, if, for example, the follower pins 22A, one in each end of the follower means are first activated by the pneumatic means to extend into the respective holes 41, as shown for one end in FIG. 4, in the side walls 9 and 9a and then, the hydraulic means 20 is activated, the drawer 3 will be moved into the open space between the two magazine units 1 and 2.

It should be noted that the innermost side wall extensions 10 and 11, 10A and 11A on respective sides of each chest 1 and 2 contain cut out portions 46 and 47 to allow the follower pins 22A and 22B, when selected, to pass therethrough to engage in its respective hole 41 and 42 in its respective side wall 9 and 10, 9A and 10A. The coutout portions 46 and 47 extend to the leading edge of the side wall extensions so that there is no obstruction to the selected follower pin when the hydraulic means 20 moves the follower pins and selected drawer into the space between the chests.

The terms and expressions which have been employed herein are used as terms of description and not of limitation, and there is not intention, in the use of such terms and expressions, of including any equivalents of the features shown and described or portions thereof but it is recognized that various modifications are possible within the scope of the invention claimed.

What is claimed is:

1. A magazine for supplying materials such as parts to a robot or like system, characterized by:
   a pallet;
   two sets of drawers having a plurality of drawers in each set positioned so that the front of each set of drawers face one another on said pallet in a spaced relationship with an open space for the drawers to open into between said two sets;
   a bottom member maintained parallel to said pallet and side walls and a front and back wall extending vertically upward from said bottom member to form each of said drawers;
   side wall extensions forming part of said side walls extending downward below said bottom member of each of said plurality of drawers to said pallet;
   means located at the bottom of each of said side wall extensions for cooperating with said pallet to allow said drawers to move into said open space between said sets of drawers;
   selecting means associated with said side wall extensions for selecting anyone of said drawers in said sets of drawers for movement into said open space between said sets of drawers; and
   motion means carrying said selecting means between said sets of drawers for moving the selected drawer from either set of drawers into said open space between said sets of drawers.

2. A magazine according to claim 1, characterized in that said two sets of drawers are arranged in the form of two chests of drawers.

3. A magazine according to claim 2, characterized in that said open space is equal to the depth of said chest of drawers.

4. A magazine according to claim 1, characterized in that said side wall extensions each include an opening cooperating with said selecting means;
   two side members extending parallel to and beneath said side wall extensions of said drawers;
   grooves running along the upper face of said two side members, said side wall extensions extending into said grooves of said side members for movement therein.

5. A magazine according to claim 4 in that said motion means includes fluidic means, a follower member attached to and movable by said fluidic means, fluidic cylinders located at each end of said follower means, and follower pins moved by said fluidic cylinders for interaction with said openings in said side wall extensions.

6. A magazine according to claim 5, characterized in that said fluidic cylinders are selectively actuable for selective interaction with said openings.

* * * * *